(12) United States Patent
Ostvik

(10) Patent No.: US 11,692,082 B2
(45) Date of Patent: Jul. 4, 2023

(54) COMPOSITIONS CONTAINING SOLID WASTE MATERIAL

(71) Applicant: Ecogensus LLC, Hartford, CT (US)

(72) Inventor: Bjornulf Ostvik, Hartford, CT (US)

(73) Assignee: Ecogensus LLC, West Hartford, CT (US)

( * ) Notice: Subject to any disclaimer, the term of this patent is extended or adjusted under 35 U.S.C. 154(b) by 0 days.

(21) Appl. No.: 17/591,494

(22) Filed: Feb. 2, 2022

(65) Prior Publication Data
US 2022/0243037 A1 Aug. 4, 2022

Related U.S. Application Data

(60) Provisional application No. 63/144,741, filed on Feb. 2, 2021.

(51) Int. Cl.
*C08K 11/00* (2006.01)

(52) U.S. Cl.
CPC .................. *C08K 11/005* (2013.01)

(58) Field of Classification Search
CPC .................................... C08K 11/005
See application file for complete search history.

(56) References Cited

U.S. PATENT DOCUMENTS

| 4,013,616 A * | 3/1977 | Wallace ............... C08J 11/06 524/549 |
| 5,312,858 A * | 5/1994 | Folsom ................ E04B 2/06 523/129 |
| 5,490,907 A | 2/1996 | Weinwurm et al. |
| 9,771,536 B2 | 9/2017 | White |
| 10,618,025 B2 | 4/2020 | Ostvik et al. |
| 2011/0272858 A1 * | 11/2011 | Tamir .................. B29C 48/41 264/319 |
| 2012/0267562 A1 | 10/2012 | Thichy |
| 2013/0324677 A1 | 12/2013 | Clark |
| 2016/0185665 A1 | 6/2016 | Al-Aqeeli et al. |
| 2018/0319066 A1 | 11/2018 | Tamir |
| 2019/0233638 A1 | 8/2019 | Zhang et al. |
| 2019/0241679 A1 | 8/2019 | Hallett et al. |

(Continued)

FOREIGN PATENT DOCUMENTS

| CN | 108033721 A | 5/2018 |
| CN | 108658537 A | 10/2018 |

(Continued)

OTHER PUBLICATIONS

No Author Listed] [online], "National Overview: Facts and Figures on Materials, Wastes and Recycling," EPA.gov, available on or before May 27, 2018, retrieved on Apr. 11, 2022, retrieved from URL <https://www.epa.gov/facts-and-figures-about-materials-waste-and-recycling/national-overview-facts-and-figures-materials>, 16 pages.

(Continued)

*Primary Examiner* — Liam J Heincer
(74) *Attorney, Agent, or Firm* — Fish & Richardson P.C.

(57) ABSTRACT

Compositions (e.g., composites) containing processed solid waste, products made from the compositions, and systems and methods for making the compositions and products, are provided herein. For example, composites containing solid waste compositions and one or more added polymers, fillers, or other compounds are provided herein.

15 Claims, 5 Drawing Sheets

(56) References Cited

U.S. PATENT DOCUMENTS

| | | |
|---|---|---|
| 2019/0337850 A1 | 11/2019 | Ali et al. |
| 2020/0181016 A1 | 6/2020 | Ali et al. |
| 2020/0255629 A1 | 8/2020 | Sahajwalla et al. |
| 2020/0263005 A1 | 8/2020 | Tamir |
| 2021/0002173 A1 | 1/2021 | Lee et al. |
| 2021/0163745 A1* | 6/2021 | Riebel ................. C08K 11/005 |
| 2021/0179852 A1 | 6/2021 | Nystrom |
| 2021/0340064 A1 | 11/2021 | Steinmuller et al. |
| 2022/0241829 A1* | 8/2022 | Ostvik ................. B33Y 70/10 |

FOREIGN PATENT DOCUMENTS

| | | |
|---|---|---|
| CN | 109553345 A | 4/2019 |
| CN | 107572936 B | 1/2020 |
| CN | 110818347 A | 2/2020 |
| CN | 109678432 B | 8/2021 |
| DE | 2615610 | 2/1983 |
| EP | 2789593 | 10/2014 |
| JP | 2005179163 A | 7/2005 |
| KR | 100602441 B1 | 7/2006 |
| KR | 10-1706116 | 2/2017 |
| WO | WO 2008/020768 | 2/2008 |
| WO | WO-2010082202 A2 * | 7/2010 ........... B09B 3/0025 |
| WO | WO-2015173806 A1 * | 11/2015 ............ B02C 23/18 |
| WO | WO 2019/106699 | 6/2019 |
| WO | WO 2019/177193 | 9/2019 |
| WO | WO 2020/188567 | 9/2020 |
| WO | WO 2020/222221 | 11/2020 |
| WO | WO 2021/009815 | 1/2021 |

OTHER PUBLICATIONS

Gu et al., "Use of recycled plastics in concrete: A critical review," Waste Management, Mar. 9, 2016,51:19-42; p. 20 col. 2 para 2, table 1.

Ohijeagbona et al., "Development and characterization of wood-polypropylene plastic-cement composite board," Case Studies in Construction Materials, Apr. 20, 2020, 13: 1-8.

PCT International Search Report and Written Opinion in International Appln. No. PCT/US2022/015003, dated Apr. 27, 2022, 10 pages.

Urreaga et al., "Sustainable eco-composites obtained from agricultural and urban waste plastic blends and residual cellulose fibers," Journal of Cleaner Production, Jun. 10, 2015, 108: 377-384.

* cited by examiner

COMPOSITIONS CONTAINING SOLID WASTE MATERIAL

CROSS-REFERENCE TO RELATED APPLICATIONS

This application claims benefit of priority from U.S. Provisional Application Ser. No. 63/144,741, filed on Feb. 2, 2021. The disclosure of the prior application is considered part of (and is incorporated by reference in) the disclosure of this application.

TECHNICAL FIELD

This document relates to compositions containing processed solid waste, products made from the compositions, and systems and methods for making the compositions and products.

BACKGROUND

Management of solid waste from residential, institutional, and commercial sources, as well as agricultural waste and other waste such as sewage sludge, is a challenging issue with ever-evolving solutions. As landfills reach and exceed capacity worldwide, and as the solid waste industry and societies generally limit the use of landfills, alternative methods of managing solid waste have been developed to reduce the volume introduced into landfills. Recycling of metals, plastics, and paper products, as well as composting organic matter are relatively common methods of reducing the overall volume of solid waste going to landfills. Waste-to-energy processes are used to convert the heat content inherent in solid waste into a more usable form, such as electricity. For example, some waste-to-energy processes incinerate solid wastes to generate heat and produce steam that drives downstream steam generators. The byproducts of such incineration processes include ash (e.g., fly ash and bottom ash), which also may contain additional unfavorable combustion byproducts (e.g., particulates), glass, and metals, causing the ash to be unsuitable for many reuse applications. Very typically, in a waste incineration process, 15-25% (and sometimes up to one third) of the solid waste, by weight, remains as ash. Almost all incineration ash in the United States is landfilled. In some countries, the ash (primarily bottom ash) is used for road construction. Alternative methods to reuse solid waste as a resource, rather than landfilling or incineration, is sought worldwide as solid waste generation continues to increase. The need to reuse solid waste as a resource also is driven by increasing constraints on the availability of natural resources. In recent years, the reduced availability of construction lumber, rapidly increasing costs, and general concern over the use of wood due to deforestation has led to an increased need for alternative compositions that do not require the use of virgin wood.

SUMMARY

This document is based, at least in part, on the development of methods, materials, and systems for generating composite materials from processed mixed wastes. The composites can be used in the production of, for example, sustainable building materials and other products. This document provides methods, materials, and systems for processing and utilizing a mixed solid waste composition (e.g., a sorted mixed solid waste composition). Such mixed wastes may have been presorted to remove certain items (e.g., glass, metals, or specific plastic types), including items that can be recycled and directly re-used. The methods for treating the solid waste can include heating and mixing a solid waste composition (e.g., solid waste from which glass and metals have been removed), and forming the resulting thermally-treated, processed solid waste composition to generate sustainable structural and non-structural building materials. In some cases, the methods provided herein can include combining one or more additives with a heated and mixed solid waste composition (also referred to herein as a "pre-processed" solid waste composition or "pre-processed" raw materials). The one or more additives can include, without limitation, one or more polymers (which may in some cases can provide a binding function), fillers, biocides, and/or fire (flame) retardants.

The compositions and methods described herein advantageously provide an eco-friendly alternative to currently available building materials (e.g., structural and non-structural materials), such as composite lumber. Composite lumber products may contain wood waste that has been reduced to chip size or ground to a powder form and then combined with one or more adhesives, resins, or other additives before being compressed into a desired form (e.g., particle board or recycled plywood). In some cases, recycled materials such as reclaimed wood or sawdust and recovered plastics are combined to form composite boards. The use of recycled materials for lumber is limited, however, by the fact that the raw material (wood or plastic) must be source-separated. For example, a recycled lumber manufacturer might procure wood "waste" from a lumber mill, where the waste is an already-separated wood by-product of a manufacturing process. If waste plastics are used, they may be a byproduct of an industrial manufacturing process or they may be separated, cleaned and prepared postconsumer waste plastics. In the latter case, the plastics might come from a Materials Recovery Facility, where the processing costs for extracting the plastics from the other wastes and/or separating them by type, cleaning them, and packaging them for re-use by a lumber producer are very high. In these conventional cases, contamination by other materials often found in residential and commercial waste ("municipal solid waste," "rubbish," or "garbage"), such as food waste or other biological materials, is not acceptable. Thus, the majority of municipal solid waste (MSW)—what is thought of as garbage or rubbish coming from residential, commercial and industrial buildings—is placed in landfills worldwide. The recycling industry is entirely built around the concept of "positive sorting," in which specific materials (e.g., particular types of plastics or metals) are removed from waste, cleaned, and reused. Unfortunately, this has left the majority of waste (residual waste) unused and destined for the landfill. Even after several decades of investment and innovation in recycling, the majority of MSW in the United States and globally is still landfilled.

In contrast, the compositions, systems, and methods described herein provide means by which MSW can be re-used, instead of being landfilled or incinerated. This document describes an entirely new approach, centered around accomplishing "negative sorting" in which select materials instead are removed (principally because they can be recycled and remain in their original state, but also as quality control to remove items, such as batteries, that should not be present in MSW), and the residual waste is then used for composites.

In a first aspect, this document features a composite containing a combination of (a) a heat-treated solid waste composition that contains mixed plastics, organic material, and less than about 3 wt. % water, and (b) one or more polymers in addition to the mixed plastics contained in the solid waste composition, where the composite has a compressive strength of at least 1500 psi. At least a portion of the mixed plastics in the heat-treated solid waste composition can form a plastic matrix within the solid waste composition. The solid waste composition can contain from about 40 wt. % to about 86 wt. % carbon, and from about 3 wt. % to about 20 wt. % hydrogen. The solid waste composition can have been sorted to remove glass and metal. The one or more polymers can include a thermoset polymer. The one or more polymers can include an epoxy resin, fiberglass-reinforced plastic, a phenolic resin, a polyester resin, polyurethane, a polyurea/polyurethane hybrid, a furan resin, a silicone resin, a vinyl ester, a cyanate ester, a melamine resin, polydicyclopentadiene, a benzoxazine, a polyimide, a bismaleimide, an electrical insulating thermoset phenolic laminate material, a nylon, polystyrene, polypropylene, a fluoropolymer, or a combination thereof. The composite can contain less than 5 wt. % water (e.g., about 0.1 wt. % to about 4 wt. % water, or about 1 wt. % to about 3 wt. % water). The composite can contain about 5 wt. % to about 60 wt. % of the polymer, about 20 wt. % to about 50 wt. % of the polymer, about 30 wt. % to about 70 wt. % of the polymer, about 5 wt. % to about 25 wt. % of the polymer, about 20 wt. % to about 40 wt. % of the polymer, about 40 wt. % to about 50 wt. % of the polymer, about 50 wt. % to about 60 wt. % of the polymer, or about 60 wt. % to about 70 wt. % of the polymer. The mixed plastics can include comprise two or more plastics selected from the group consisting of polyester, polyethylene terephthalate, polyethylene, polyvinyl chloride, polyvinylidene chloride, polypropylene, polystyrene, polyamides, acrylonitrile-butadiene-styrene, polyethylene/acrylonitrile-butadiene-styrene, polycarbonate, polycarbonate/acrylonitrile butadiene styrene, polyurethanes, maleimide/bismaleimide, melamine formaldehyde, phenol formaldehydes, polyepoxide, polyetheretherketone, polyetherimide, polyimide, polylactic acid (PLA), polymethylmethacrylate, polytetrafluoroethylene, and urea-formaldehyde. The total amount of plastics present in the composite can be greater than 70 wt. %, greater than 80 wt. %, or greater than 90 wt. %. The solid waste composition can be derived from municipal solid waste, agricultural waste, or both. The composite can further include a flame retardant (e.g., a flame retardant selected from the group consisting of phosphate flame retardants, silicon-based flame retardants, metal hydroxide flame retardants, melamine flame retardant, phosphorus-based flame retardants, halogenated flame retardants, brominated flame retardants, polymeric flame retardants, and retardant coatings comprising bio-based chitosan, phytic acid, and divalent metal ions). The composite can further include a biocide (e.g., a biocide selected from the group consisting of copper azole (CuAz), ammoniacal copper quaternary (ACQ), 4,5-dichloro-2-octyl-isothiazolone, zinc pyrithione, carbendazim, tung oil, linseed, and beeswax). The composite can further include an additive (e.g., a recycled plastic, PLA, or wood waste). The composite can have a coating that forms an exterior surface of the composite. The composite can be a molded composite. The composite can be an injection molded composite. The composite can be in the form of a construction material (e.g., a board, a plank, a stud, a block, or a brick). The composite can include one or more elongate solid polymer components extending within the composite. The composite can contain about 30 wt. % to about 70 wt. % of the solid waste composition, about 5 wt. % to about 70 wt. % of the one or more polymers, and about 0.01 wt. % to about 5 wt. % water.

In another aspect, this document features a composite that includes a polymer, a solid waste composition containing mixed plastics and organic material, and water, where the composite has a compressive strength of at least 1500 psi.

In another aspect, this document features a method for making a composite. The method can include (a) heating, in a process vessel, a solid waste composition that contains mixed plastics and organic materials, such that at least a portion of the mixed plastics in the solid waste composition becomes melted, and (b) during or after the heating, adding a polymer to the solid waste composition. The composite can contain about 5 wt. % to about 70 wt. % of the polymer. The polymer can include a thermoset resin. The thermoset resin can include an epoxy resin, fiberglass-reinforced plastic, a phenolic resin, a polyester resin, polyurethane, a polyurea/polyurethane hybrid, a furan resin, a silicone resin, a vinyl ester, a cyanate ester, a melamine resin, polydicyclopentadiene, a benzoxazine, a polyimide, a bismaleimide, electrical insulating thermoset phenolic laminate material, a nylon, polystyrene, polypropylene, a fluoropolymer, or a combination thereof. The method can include adding the thermoset resin at a temperature less than 70° C. The method can further include, during or after the solid waste composition is heated, adding an additive, a flame retardant, or a biocide. The additive can include comprises recycled plastic, PLA, or wood waste. The method can further include adding a biocide (e.g., a biocide selected from the group consisting of CuAz, ACQ, 4,5-dichloro-2-octyl-isothiazolone, zinc pyrithione, carbendazim, tung oil, linseed, and beeswax). The biocide can be added at a temperature less than 50° C. The method can further include adding a flame retardant (e.g., a flame retardant selected from the group consisting of phosphate flame retardants, silicon-based flame retardants, metal hydroxide flame retardants, melamine flame retardant, phosphorus-based flame retardants, halogenated flame retardants, brominated flame retardants, polymeric flame retardants, and retardant coatings comprising bio-based chitosan, phytic acid, and divalent metal ions). The method can further include forming the composite into a selected shape, where the forming includes molding the composite, and cooling the molded composite. The molding can include injection molding the composite, extrusion die molding the composite, or processing the composite with a conventional screw conveyor, a conveyor die, or both. The forming can include forming the composite into a shape having a length, a width, and a height, wherein the width and the height have sizes selected from the group consisting of 2 inches by 4 inches, 2 inches×6 inches, 2 inches×8 inches, 2 inches×10 inches; 1 inch×2 inches, 1 inch×4 inches, 1 inch×6 inches, and 1 inch×8 inches. The method can further include, after the at least a portion of the mixed plastics of the solid waste composition has been melted, removing the solid waste composition from the process vessel. The method can include, during or after at least a portion of the mixed plastics of the solid waste composition is melted, adding the polymer to the solid waste composition. The polymer can be added to the solid waste composition as it moves along a conveyor (e.g., a ribbon screw conveyor or a shaftless spiral conveyor). The polymer can form a support structure within the composite. The mixed plastics can be present in an amount of about 5 wt. % to about 60 wt. % of the solid waste composition.

In still another aspect, this document feature a method of making a composite. The method can include (a) heating, in a process vessel, a solid waste composition that contains mixed plastics and organic materials, and (b) during or after the solid waste composition is heated, adding a polymer to the solid waste composition.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
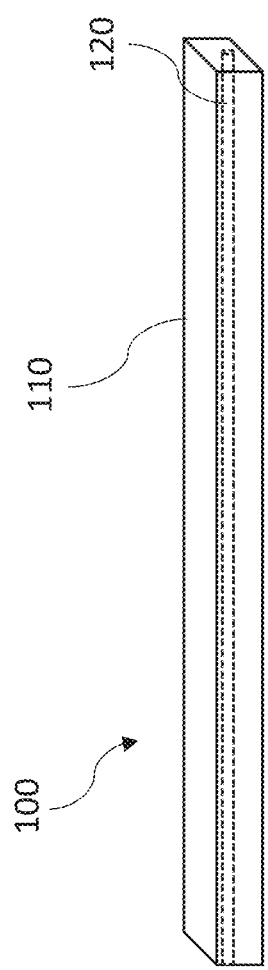
FIG. 1A is an illustration showing a perspective view of a board having a polymer "rod" extending axially therethrough.

This document provides methods and materials for using typically landfilled waste as a raw material for compositions that may be used, for example, in sustainable building materials, including both structural and non-structural building materials. In particular, this document provides methods, materials, and systems for processing mixed solid waste to generate composites, and products containing the composites. In some cases, a mixed solid waste can be pre-treated by partial sorting, heating, mixing, or any combination thereof, to yield a solid waste composition (also referred to herein as a "pre-processed mixed solid waste" or a "thermomechanically processed mixed solid waste"). The solid waste composition can be combined with one or more polymers and/or other additives to generate a composite provided herein.

In general, the components of a composite produced by the methods provided herein include a solid waste composition. In some cases, a composite can include a solid waste composition and one or more polymers (e.g., binding polymers), fillers, biocides, flame retardants, other additives, or any combination thereof. For example, a composite can include a solid waste composition and one or more specific, added polymers, such as a thermosetting polymer, where the one or more added polymers are extraneous to the solid waste composition. In some cases, the composites provided herein also can include a small amount of water.

"Waste" generally refers to carbon-containing combustible material that has been discarded after its primary use, including solid waste. Generally, the waste may be wet and heterogeneous, containing a portion of non-combustible waste. "Solid waste" refers to any garbage, or refuse, sludge from a wastewater treatment plant, water supply treatment plant, or air pollution control facility and other discarded material, including solid, liquid, semi-solid, or contained gaseous material resulting from industrial, commercial, mining, and agricultural operations, and from community activities.

A variety of sources of solid waste can be used to produce the composites provided herein. For example, a solid waste mixture can be derived from non-hazardous waste sources including, but not limited to, municipal waste, agricultural waste, sewage sludge, household waste, discarded secondary materials, and industrial solid waste. "Municipal waste" or MSW may refer to any household waste or commercial solid waste or industrial solid waste. Non-limiting examples of wastes that may be included in the solid waste mixture include biodegradable waste such as food and kitchen waste, green wastes such as lawn or hedge trimmings, paper, mixed plastics, solid food waste, solid agricultural waste, sewage sludge, and automotive shredder residue.

"Household waste" or "residential waste" refers to any solid waste (including garbage, trash, and sanitary waste in septic tanks) derived from households (including single and multiple residences, hotels and motels, bunkhouses, ranger stations, crew quarters, campgrounds, picnic grounds, and day-use recreation areas).

"Commercial solid waste" refers to all types of solid waste generated by stores, offices, restaurants, warehouses, and other nonmanufacturing activities, excluding residential and industrial wastes.

"Industrial solid waste" refers to non-hazardous solid waste generated by manufacture or industrial processes. Examples of industrial solid waste include, without limitation, waste resulting from manufacturing processes such as electric power generation, production of fertilizer and agricultural chemicals, production of food and related products, production of leather and leather products, production of organic chemicals, plastic and resin manufacturing, production of pulp and paper, production of rubber and miscellaneous plastic products, textile manufacturing, production of transportation equipment, and water treatment. The term "industrial solid waste" does not include mining waste or oil and gas waste.

In some cases, a solid waste mixture can contain discarded non-hazardous secondary material, in which case composites produced from those solid waste mixtures may be legally categorized as "non-waste." "Secondary material" refers to any material that is not the primary product of a manufacturing or commercial process, and can include post-consumer material, off-specification commercial chemical products or manufacturing chemical intermediates, post-industrial material, and scrap. Examples of non-hazardous secondary materials include scrap tires that are not discarded and are managed by an established tire collection program, including tires removed from vehicles and off-specification tires, resinated wood, coal refuse that has been recovered from legacy piles and processed in the same manner as currently-generated coal refuse, and dewatered pulp and paper sludges that are not discarded and are generated and burned on-site by pulp and paper mills that burn a significant portion of such materials where such dewatered residuals are managed in a manner that preserves the meaningful heating value of the materials.

"Resinated wood" refers to wood products that contain binders and/or adhesives and are produced by primary and secondary wood products manufacturing. Resinated wood includes residues from the manufacture and use of resinated wood, including materials such as board trim, sander dust, panel trim, and off-specification resinated wood products that do not meet a manufacturing quality or standard.

"Mixed plastics" refer to any combination of synthetic or semi-synthetic organics that are malleable and can be molded into solid objects of diverse shapes, and typically are found in municipal solid waste. Examples of plastics that may be found in a solid waste composition include, without limitation, polyester (PES), polyethylene terephthalate (PET), polyethylene (PE), high-density polyethylene (HDPE), polyvinyl chloride (PVC), polyvinylidene chloride (PVDC, SARAN™), low-density polyethylene (LDPE), polypropylene (PP), polystyrene (PS), polyamides (PA) (nylons), acrylonitrile butadiene styrene (ABS), polyethylene/acrylonitrile butadiene styrene (PE/ABS), polycarbonate (PC), polycarbonate/acrylonitrile butadiene styrene (PC/ABS), polyurethanes (PU), maleimide/bismaleimide, melamine formaldehyde (MF), phenol formaldehydes (PF), poly-epoxide (epoxy), polyetheretherketone (PEEK), polyetherimide (PEI, Ultem™), polyimide, polylactic acid (PLA), polymethyl methacrylate (PMMA, acrylic), polytetrafluoroethylene (PTFE), urea-formaldehyde (UF), and any combination thereof.

In some cases, a solid waste mixture can be analyzed to detect different types of contents. Based on the analysis, a municipal solid waste stream can be lightly sorted to remove waste materials such as, for example, glass, metals (e.g., scrap metal, metal chunks, ferrous metals such as iron, steel, and other iron-containing alloys, and non-ferrous metals that do not contain an appreciable amount of iron), and/or concrete, resulting in a sorted solid waste. In some cases, a solid waste mixture can be analyzed to determine the amount of mixed plastics present therein. To form a composite provided herein, the solid waste mixture can be combined with one or more added polymers in a ratio that is based on the analysis.

It is to be noted that different solid waste mixtures can have a highly variable composition due to the variable nature of municipal solid waste streams. A municipal solid waste stream may vary in composition due to a variety of factors including, without limitation, different seasons, different locations within a country (e.g., urban versus rural), and/or different countries (e.g., industrial versus emerging). The amount of water contained within a solid waste mixture also can vary, and can influence the time and/or maximum temperature needed to remove the water from the solid waste mixture during the methods described herein. For example, a mixed solid waste used as a feedstock for a composite provided herein may contain an amount of water ranging from about 10 wt. % to about 60 wt. % (e.g., about 10 wt. % to about 20 wt. %). In some cases, a mixed solid waste can contain at least 10 wt. % water (e.g., at least 20 wt. % water, at least 30 wt. % water, at least 40 wt. % water, or at least 50 wt. % water).

In general, the solid waste compositions used in the composites provided herein contain a combination of materials that includes mixed plastics, organic material (e.g., organic material from waste products such as municipal or agricultural waste), and water. The solid waste compositions can include, for example, components from MSW and/or agricultural waste, as well as any other appropriate type of waste. The typical contents of MSW, per the United States Environmental Protection Agency (2018), are as follows:

| paper/paperboard | 23.1% |
| food | 21.6% |
| plastics | 12.2% |
| wood | 6.2% |
| yard trimmings | 12.1% |
| rubber and leather | 3.1% |
| textiles | 5.8% |
| glass | 4.2% |
| metals | 8.8% |
| misc. inorganic waste | 1.4% |
| other | 1.5% |

See, epa.gov/facts-and-figures-about-materials-waste-and-recycling/guide-facts-and-figures-report-about-materials.

In some cases, mixed plastics may not be present in a solid waste composition, or may be present in a small amount (e.g., less than 5 wt. %, less than 4 wt. %, less than 3 wt. %, less than 2 wt. %, or less than 1 wt. %). In some cases, mixed plastics can be present in a solid waste composition in an amount from about 5 wt. % to about 60 wt. % (e.g., about 5 wt. % to about 20 wt. %, about 10 wt. % to about 30 wt. %, about 20 wt. % to about 40 wt. %, about 30 wt. % to about 50 wt. %, or about 40 wt. % to about 60 wt. %).

A solid waste composition provided herein can include any appropriate amount of carbon, hydrogen, and oxygen. For example, a solid waste composition can contain from about 40 wt. %. to about 86 wt. % carbon (e.g., about 40 wt. % to about 50 wt. %, about 50 wt. % to about 60 wt. % about 60 wt. % to about 70 wt. %, about 70 wt. % to about 80 wt. %, or about 80 wt. % to about 86 wt. % carbon), from about 3 wt. % to about 20 wt. % hydrogen (e.g., about 3 wt. % to about 5 wt. %, about 5 wt. % to about 10 wt. %, about 10 wt. % to about 15 wt. %, or about 15 wt. % to about 20 wt. % hydrogen), as well as oxygen. As described herein, a mixed solid waste can be heated and/or mixed prior to being combined with the other component(s) of a composite. In some cases, such a thermomechanically processed mixed solid waste can have a water content of, for example, less than about 5 wt. % (e.g., less than about 4 wt. %, less than about 3 wt. %, less than about 2 wt. %, less than about 1 wt. %, about 0.1 to about 4 wt. %, about 0.5 to about 2 wt. %, about 1 to about 3 wt. %, about 2 to about 4 wt. %, or about 3 to about 5 wt. %). In some cases, a solid waste composition may include no water.

In some cases, a composite provided herein can include at least one polymer (e.g., a binding polymer) in addition to the polymers and/or plastics present in the solid waste composition. The composites provided herein can include, for example, from about 10 wt. % to about 75 wt. % of the solid waste composition and from about 5 wt. % to about 70 wt. % of one or more added polymers). For example, the composites can contain from about 10 wt. % to about 20 wt. %, about 20 wt. % to about 30 wt. %, about 30 wt. % to about 40 wt. %, about 40 wt. % to about 50 wt. %, about 50 wt. % to about 60 wt. %, about 60 wt. % to about 70 wt. %, about 30 to about 75 wt. %, or about 50 to about 75 wt. % of the solid waste composition, and from about 5 wt. % to about 10 wt. %, about 10 wt. % to about 20 wt. %, about 15 wt. % to about 30 wt. %, about 20 wt. % to about 25 wt. %, about 25 wt. % to about 40 wt. %, about 40 wt. % to about 50 wt. %, about 50 wt. % to about 60 wt. %, or about 60 wt. % to about 70 wt. % of added polymer(s).

In some embodiments, a composite provided herein can include a total amount of plastics (an amount that includes plastic in the added polymer and the solid waste material) that is greater than 60 wt. % (e.g., greater than 65 wt. %, greater than 70 wt. %, greater than 75 wt. %, greater than 80 wt. %, greater than 90 wt. %, from about 60 to about 70 wt. %, from about 70 to about 80 wt. %, or from about 80 to about 90 wt. %). In some embodiments, a composite provided herein can include a total amount of plastics that is from about 2 wt. % to about 70 wt. % (e.g., about 2 wt. % to about 10 wt. %, about 10 wt. % to about 20 wt. %, about 20 wt. % to about 40 wt. %, about 40 wt. % to about 60 wt. %, or about 60 wt. % to about 70 wt. %). In some cases, a composite provided herein can include at least five different polymers and/or plastics (e.g., at least 10, at least 15, at least 20, or at least 25 different polymers and/or plastics).

Any appropriate polymer can be included in the composites provided herein. In some cases, for example, a composite can include a thermoset resin. The inclusion of a polymer such as a thermoset resin can increase the structural integrity of the finished product, and can allow continuous hardening of the product when exposed to sun (UV rays) and/or heat. Examples of thermoset resins that can be added to a pre-processed raw material include, without limitation, epoxy resins, fiberglass-reinforced plastic, phenolic resins, polyester resins, polyurethanes including elastomeric polyurethanes, polyurea/polyurethane hybrids, furan resins, silicone resins, vinyl ester, cyanate esters, melamine resins, polydicyclopentadiene, benzoxazines, polyimides, bismaleimides, electrical insulating thermoset phenolic laminate material (e.g., THIOLYTE®), nylons, polystyrene, polypropylene, fluoropolymers, and combinations thereof. In some cases, one or more UV-curable resins can be used. When included in a composite provided herein, the one or more added polymers (e.g., one or more thermosetting polymers) can be added in an amount such that the end product contains from about 5 wt. % to about 70 wt. % (e.g., about 20 wt. % to about 50 wt. %, about 30 wt. % to about 70 wt. %, about 5 wt. % to about 25 wt. %, about 20 wt. % to about 40 wt. %, about 40 wt. % to about 50 wt. %, about 50 wt. % to about 60 wt. %, or about 60 wt. % to about 70 wt. %) of the polymer(s).

In some cases, the ratio of added polymer to solid waste composition in a composite provided herein can be adjusted to meet desired final product specifications, including desired elasticity and rigidity. In some cases, for example, a composite can have a ratio of solid waste composition to added polymer blend that yields a final product with Poisson's ratios similar to those of hardwood species (e.g., oak, walnut, birch, white ash, black cherry, mahogany, or maple) or softwood species (e.g., cedar, fir, pine, hemlock, larch, redwood, or spruce). In some cases, the amount of polymer added to a solid waste composition can increase the total amount of plastics in the resulting composition product by at least about 5% (e.g., at least about 10%, at least about 15%, at least about 20%, at least about 25%, at least about 30%, at least about 40%, at least about 50%, at least about 60%, at least about 70%, at least about 75%, at least about 80%, at least about 90%, or at least about 100%), as compared to the amount of plastics in the solid waste composition alone. In some cases, the Poisson's ratios can be from about 0.19 to about 0.489. The Modulus of Elasticity (Young's modulus) in some cases can range from about 7 to 16 GPa, about 5 to 7 GPa, or about 3 to 5 GPa.

The composites provided herein can have any appropriate compressive strength, tensile strength, and/or flexural yield strength. In general, the composites provided herein are strong enough to hold a screw, bolt, nail, or other construction fastener. As used herein, terms such as "compressive strength" and "tensile strength" refer to the actual (e.g., measured) values for a composite provided herein. Such measures typically are referred to in the art as the "ultimate" values for compressive strength, tensile strength, etc. The fundamental nature of the composites described herein provides advantages as compared to wood products. These advantages include, for example, increased strength and flexibility. Without being bound by mechanism, the improved strength and flexibility may be due to the compositions of the composites provided herein, which can include mixed plastics in the solid waste composition, as well as one or more added polymers.

In some cases, a composite can have a tensile strength that is at least 5% (e.g., at least 10%, at least 15%, at least 20%, at least 30%, at least 40%, at least 50%, at least 60%, at least 70%, at least 80%, at least 90%, at least 100%, or at least 200%) greater than the tensile strength of the solid waste composition. For example, a composite can have a tensile strength of about 40 MPa to about 150 MPa (e.g., about 40 to about 60 MPa, about 60 to about 75 MPa, about 75 to about 90 MPa, about 90 to about 105 MPa, about 105 to about 120 MPa, about 120 to about 135 MPa, or about 135 to about 150 MPa), particularly in the axial direction for composites that have an elongate configuration, such as planks or boards. In some cases, such as for composites with higher polymer (e.g., thermoset or UV-curing resin) content, a composite can have a tensile strength between about 150 MPa and about 450 MPa (e.g., about 150 to about 250 MPa, about 250 to about 350 MPa, or about 350 to about 450 MPa). In some cases, a composite can have a cross-sectional tensile strength of about 1.5 MPa to about 7 MPa (e.g., about 1.5 to about 2.5 MPa, about 2.5 to about 4 MPa, about 4 to about 5 MPa, about 5 to about 6 MPa, or about 6 to about 7 MPa).

In some cases, a composite can have a compressive strength (the ability to hold weight under pressure) that is at least 5% (e.g., at least 10%, at least 15%, at least 20%, at least 30%, at least 40%, at least 50%, at least 60%, at least 70%, at least 80%, at least 90%, at least 100%, or at least 200%) greater than the compressive strength of the solid waste composition. In some cases, a composite can have a compressive strength of at least 1500 psi (e.g., at least 2000 psi, at least 2500 psi, at least 3000 psi, at least 3500 psi, at least 4000 psi, at least 4500 psi, at least 4800 psi, at least 5000, at least 5500 psi, at least 6000 psi, at least 6500 psi, at least 7000 psi, at least 7500 psi, about 1500 to about 2500 psi, about 2000 to about 3000 psi, about 3000 to about 4000 psi, about 4000 to about 5000 psi, about 5000 to about 6000 psi, about 6000 to about 7000 psi, about 7000 to about 7500 psi, about 1500 to about 4500 psi, or about 4500 to about 7500 psi).

In some cases, a composite provided herein can have a compressive strength that is comparable to or greater than the compressive strength of a particular type of standard material (e.g., wood or concrete). For example, a composite can have a compressive strength comparable to (e.g., within about 10% greater or less than) the compressive strength of a corresponding sample (a sample of a material having dimensions that are substantially the same as the dimensions of the composite) made from pine (e.g., white pine), ash, elm, maple, oak (e.g., red oak), teak, mahogany, or any other particular type of wood. In some cases, a composite can have a compressive strength that is at least 50% greater than the compressive strength of a particular type of material (e.g., a particular type of wood, such as ash, pine, elm, maple, oak, teak, or mahogany).

In some cases, a composite can have a flexural yield strength (also referred to as modulus of rupture) that is at least 5% (e.g., at least 10%, at least 15%, at least 20%, at least 30%, at least 40%, at least 50%, at least 60%, at least 70%, at least 80%, at least 90%, at least 100%, or at least 200%) greater than the flexural yield strength of the solid waste composition. For example, a composite provided herein can have a flexural yield strength that is about 35 MPa to about 60 MPa or greater (e.g., about 35 to about 40 MPa, about 40 to about 45 MPa, about 45 to about 50 MPa, about 50 to about 55 MPa, about 55 to about 60 MPa, or more than 60 MPa).

In some cases, a composite can have a modulus of rupture that is about 1.5 MPa to about 50 MPa (e.g., about 1.5 to about 10 MPa, about 10 to about 20 MPa, about 20 to about 30 MPa, about 30 to about 40 MPa, or about 40 to about 50 MPa). In some cases, a composite provided herein can have a modulus of rupture that is about 50 MPa to about 100 MPa (e.g., about 50 to about 50 MPa, about 60 to about 70 MPa, about 70 to about 80 MPa, about 80 to about 90 MPa, or about 90 to about 100 MPa). In some cases, such as when a composite contains a relative high percentage of thermoset and/or UV-curing resin, the modulus of rupture can be greater than 100 MPa (e.g., greater than 150 MPa, greater than 200 MPa, or greater than 300 MPa).

Any suitable methods can be used to determine the compressive strength, the tensile strength, and the flexural yield strength, of a composite and/or a solid waste composition. For example, compression strength can be measured by American Society for Testing and Materials (ASTM) method D198 (parallel or axial) and ASTM D143 (perpendicular or cross-sectional). Tensile strength also can be measured with ASTM D198. The flexural yield strength can be measured with ASTM D4761.

In some cases, a composite provided herein can include a carbon fiber or carbon fiber-reinforced polymer, which can enhance one or more attributes of the resulting composite with respect to structural measures. For example, carbon fibers can provide structural reinforcement (e.g., in a reinforcement layer) during a molding process and during use of the resulting composite. Carbon fiber-reinforced products also can have improved tensile strength, modulus of elasticity, and fatigue properties as compared to products made from processed mixed solid wastes alone.

The composites provided herein also can include one or more components in addition to the solid waste composition and the added polymer(s). For example, a composite can contain one or more recycled plastics, PLA, wood waste (e.g., sawdust), biocides, and/or flame retardant materials.

In some cases, for example, a composite can contain one or more biocides, which can reduce or prevent growth of pathogens such as, without limitation, molds, fungi, bacteria, and/or yeast. Examples of biocides that can be included are copper azole (CuAz), ammoniacal copper quaternary (ACQ), 4,5-dichloro-2-octyl-isothiazolone, zinc pyrithione, and carbendazim. In some cases, a natural, environmentally-friendly wood sealer (e.g., tung oil, linseed, or beeswax) can be used as an alternative to a synthetic biocide. A composite can include any appropriate amount of one or more biocides (e.g., about 0.00001 wt. % to about 1 wt. %, about 0.00001 wt. % to about 0.0001 wt. %, about 0.0001 to about 0.001 wt. %, about 0.001 to about 0.01 wt. %, about 0.01 to about 0.1 wt. %, or about 0.1 to about 1 wt. %).

In some cases, a composite provided herein can contain one or more flame retardant materials that provide for fire-proofing or fire retardation. Examples of suitable flame retardants include, without limitation, phosphate flame retardants, silicon-based flame retardants, metal hydroxide flame retardants, melamine flame retardant, phosphorus-based flame retardants, halogenated flame retardants, and brominated flame retardants. In some cases, a composite can contain one or more polymeric flame retardants, retardant coatings made from bio-based chitosan, phytic acid and divalent metal ions, or other types of ecologically-friendly flame retardants. A composite can include any appropriate amount of one or more flame retardant materials (e.g., about 0.00001 wt. % to about 1 wt. %, about 0.00001 wt. % to about 0.0001 wt. %, about 0.0001 to about 0.001 wt. %, about 0.001 to about 0.01 wt. %, about 0.01 to about 0.1 wt. %, or about 0.1 to about 1 wt. %).

In some cases, a composite provided herein can contain about 10 wt. % to about 70 wt. % solid waste composition, about 5 wt. % to about 70 wt. % added polymer(s), about 0.00001 wt. % to about 1 wt. % additive/biocide/flame retardant, and about 0.1 wt. % to about 5 wt. % water.

This document also provides methods and systems for producing the composites provided herein. In some cases, the methods and systems can make use of certain aspects of the processes and systems described in U.S. Pat. Nos. 9,771,536 and 10,618,025, which are incorporated herein by reference in their entirety. For example, the methods and systems described in U.S. Pat. Nos. 9,771,536 and 10,618,025 can be used to form the solid waste composition or to form, at least in part, the composites provided herein.

For example, the present document provides methods and materials for producing sustainable products (e.g., sustainable building materials) from mixed solid waste streams. In some cases, the methods can include the use of front-end sorting equipment to remove metals, glass, rocks/aggregate, or other undesirable materials from a solid waste stream. For example, magnets can be used to remove ferrous metals, an Eddy Current Separator can be used to remove non-ferrous metals (which also can be removed manually), a Trommel Screen can be used to remove oversized material, and/or an air sorter can be used to remove glass. All other materials, including food waste and other organic material, can remain in the solid waste stream unsorted. The methods can include heating the materials in the solid waste composition in a negative pressure environment, which can have the effect of removing substantially all of the moisture from the solid waste composition and the composites generated therefrom. Certain components of solid waste can have a high moisture content. For example, food waste can have a moisture content of about 70% and can initially make up a substantial portion of an incoming MSW stream. Removal of substantially all moisture content from the food waste (e.g., in a negative pressure environment) can significantly reduce the ratio of food-origin material in the final product, which in turn can reduce the relative significance of the food material. In addition, the process can bring the material to low torrefaction temperatures, including temperatures at which there is thermal decomposition of some of the materials (e.g., hemicellulose), thus acting as a thermal pretreatment of paper, paperboard, textiles, wood, and dry components of the food waste.

Thermal pre-treatment also can be used to reduce the water content of a mixed solid waste, and to melt at least a portion of the plastics within the mixed solid waste. It is noted that thermal pre-treatment of wood has been used for wood composites, such as particleboard, fiberboard, or flakeboard. The thermal pretreatment of wood can result in removal of hemicelluloses (typically when temperatures reach 230° C. or 240° C.), improve the crystallinity index of cellulose, and reduce the cellulose degree of polymerization. At such temperatures, lignin (which provides strength benefits) is generally not affected. Thermal pretreatment can inhibit wood swelling, provide improved resistance to decay, and in some cases, can improve mechanical properties of the wood.

In some cases, a large portion of a MSW (beyond the wood waste that may be present within the MSW) may contain hemicelluloses and cellulose. Thus, a solid waste composition may contain, as the majority its composition, paper/paperboard, food, and yard waste. These materials are comprised largely of plant material, including cellulose, hemicellulose and, in the case of materials made from wood or woody biomass, lignin. The methods provided herein can include thermally treating the entirety of post-sorted residual MSW, such that in addition to providing other benefits (e.g., water removal), the characteristics of the plant-based components of waste are improved.

For example, a method for producing a composite provided herein (e.g., a composite for making structural or non-structural products such as sustainable building materials) can include heating a solid waste composition (e.g., in a process vessel such as a barrel) to a temperature sufficient to reduce the water content of the solid waste composition and to melt at least a portion of the plastics contained within the solid waste composition. Any appropriate temperature can be used. In some cases, for example, a mixed solid waste can be heated to a temperature of about 38° C. to about 210° C. (e.g., about 38° C. to about 45° C., about 45° C. to about 60° C., about 60° C. to about 70° C., about 70° C. to about 80° C., about 80° C. to about 90° C., about 90° C. to about 100° C., about 100° C. to about 105° C., about 105° C. to about 110° C., about 110° C. to about 120° C., about 120° C. to about 130° C., about 130° C. to about 140° C., about 140° C. to about 150° C., about 150° C. to about 160° C., about 160° C. to about 170° C., about 170° C. to about 180° C., about 180° C. to about 190° C., about 190° C. to about 200° C., or about 200° C. to about 210° C.). In some cases, the temperature to which the mixed solid waste is heated can be within a range that is sufficient to substantially remove microbes that may be present in the mixed solid waste during the processing. This can eliminate or reduce the likelihood of degradation of the material and corresponding reduction in structural integrity, which otherwise might result from the presence of viable microbes in the raw material feedstock. Moreover, the use of temperatures that allow the plastics content of the mixtures to melt can help to facilitate the distribution of plastics within the solid waste material. Further, in some cases, air can be removed from the process vessel during heating, in order to reduce the likelihood of combustion that otherwise might occur due to the presence of oxygen in the vessel. A mixed solid waste can be heated and/or mixed for any suitable length of time (e.g., about 20 minutes to about 30 minutes, about 30 minutes to about 60 minutes, about 1 hour to about 2 hours, about 2 hours to about 4 hours, about 4 hours to about 6 hours, about 6 hours to about 8 hours, or about 8 hours to about 12 hours).

In some cases, the methods provided herein for treating (e.g., heating and melting) a solid waste composition can be carried out using a process vessel. A representative example of a process vessel is described in U.S. Pat. No. 10,618,025, which is incorporated herein by reference in its entirety.

The methods provided herein for making a composite also can include adding one or more polymers (e.g., one or more thermosetting polymers and/or one or more UV-curable polymers or resins) to a solid waste composition. The polymer(s) can be added at any appropriate point, including before, during, or after heating of the solid waste composition. For example, one or more polymers can be mixed with a solid waste composition before or during heating of the solid waste composition (e.g., in a process vessel). In such cases, the added polymer(s) can become substantially evenly mixed with the solid waste composition. In addition, heating the mixture can cause at least a portion of the added polymer(s) to melt along with mixed plastics that may be present in the solid waste composition. The one or more polymers also can fill spaces within the solid waste composition, which can contribute to a very strong, consistent composite product. In some cases, one or more polymers can be added after the solid waste composition has been heated. For example, one or more polymers (e.g., one or more thermosetting polymers) can be added to a solid waste composition after it has exited a process chamber in which the composition was heated and mixed. In some cases, the polymer(s) added to the solid waste composition after heating can provide structural support to the composition. For example, a polymer (e.g., a UV-activated polymer) added after the heating step can cross-link to polymers already present in the solid waste composition, and/or can form polymer matrices or solid structures within the solid waste composition. It is to be noted that in some cases, the methods provided herein can include adding one or more first polymers to a solid waste composition before or during heating and mixing, and adding one or more second polymers to the composition after it has been heated and mixed. The one or more "first" polymers can be completely different than the one or more "second" polymers, or there may be one or more polymers that are included in both the "first" added polymers and the "second" added polymers.

In some cases, a method provided herein can include a densifying step in which a solid waste/polymer composition is passed along or through a component such as a conveyor, a die, a mold, or a combination thereof. Such a component can be coupled to an opening in the processing vessel or to a component (e.g., a flange) that serves to narrow the diameter of the system (e.g., by about half, such as from a diameter of about 20 inches to a diameter of about 10 inches). For example, a conveyor (e.g., a shaftless spiral conveyor, a ribbon screw conveyor, or a conventional screw conveyor) can be coupled to an opening (e.g., via a flange) in the barrel in order to move the pre-processed raw material (e.g., a heated and mixed solid waste/added polymer composition) into a mold for forming into a building product. Using a component that is narrower than the barrel can allow the pre-processed raw material to be densified, even if the material is then permitted to expand during a later step (e.g., during movement along a ribbon or shaftless spiral conveyor). The densifying step can be optional, however, and in some cases, the barrel portion can be extended to an attachment that is external to the system, where the attachment has substantially the same diameter as the barrel.

Figure 1B:
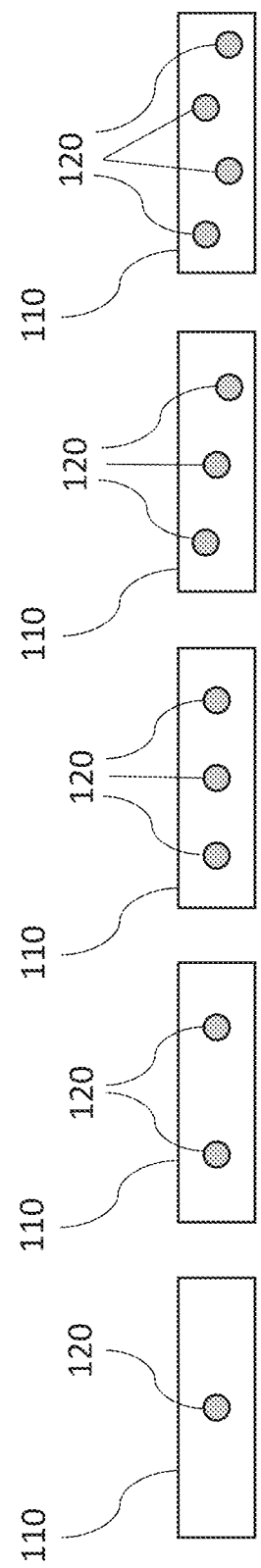
FIG. 1B is an illustration showing end views of boards having one, two, or three polymer "rods" extending axially therethrough.

In some cases, a method provided herein can include placing (e.g., extruding or injecting) one or more (e.g., two, three, four, five, or more than five) elongate "rods" of a polymer, such as a thermosetting polymer or a UV-activated polymer, into or onto a solid waste composition after it has been heated and mixed (and in some cases, mixed with one or more first added polymers). For example, a heated and mixed solid waste composition can exit a process vessel, and pass along a conveyor before it is formed into a final product. As the solid waste composition passes along the conveyor, one or more streams of fluid polymer can be extruded onto the solid waste composition, or in some cases, into one or more channels that were formed in the solid waste composition as it passed through a dye before contacting the conveyor. After the one or more polymers are placed into or onto the solid waste material, a further amount of processed solid waste material can be placed on top of the polymer(s), such that the polymer(s) form one or more support structures encased within the solid waste material. Once the one or more polymers harden, they can effectively add strength to the composite product. In some cases, the one or more "rods" of polymeric material can extend axially through a composite product (e.g., a plank or a board). In some cases, the one or more "rods" of polymeric material can extend laterally through a composite product. Representative examples of composite products having polymer support "rods" encased therein are illustrated in FIGS. 1A and 1B. In particular, FIG. 1A depicts composite product 100, which is in the form of board 110 and has polymer 120 extending axially between its ends. FIG. 1B depicts end views of various configurations for composite product 100, in which board 110 has one, two, or three rods of polymer 120 extending therethrough.

Figure 2:
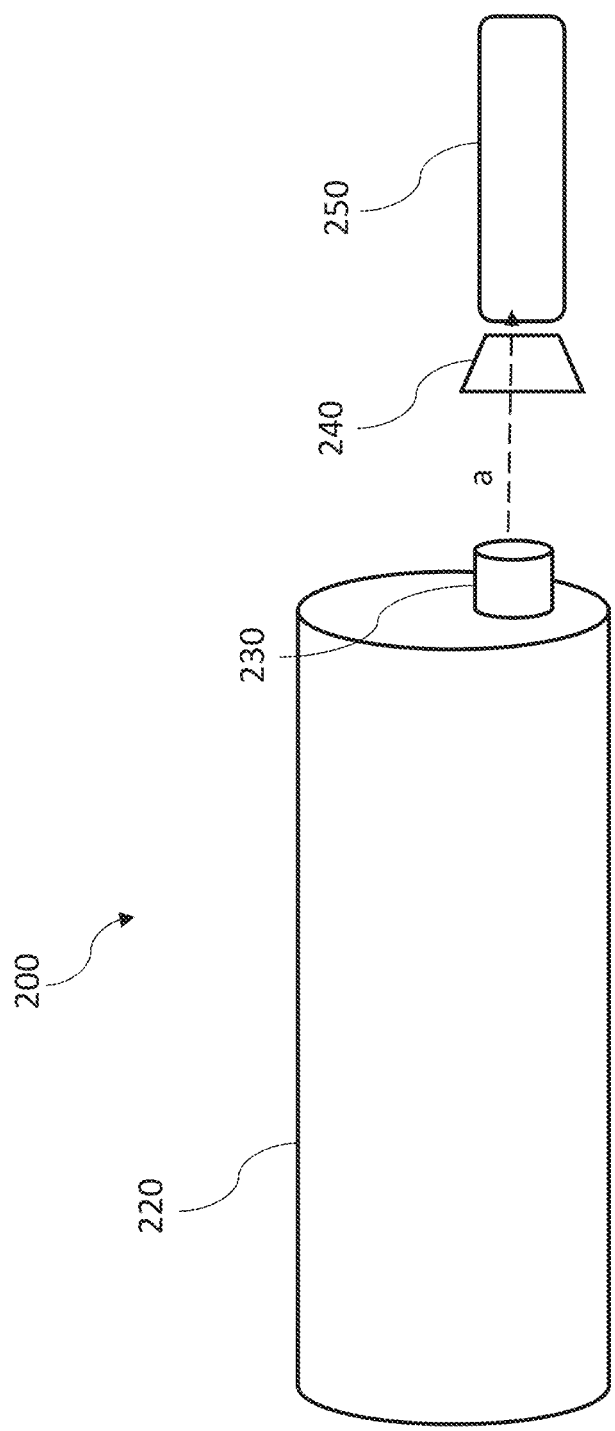
FIG. 2 is an illustration showing an embodiment of a solid waste processing system that can be used to make composites provided herein.

In some cases, the methods provided herein can include passing a pre-processed raw material (e.g., a heated and mixed solid waste composition) through a customized die attached to an output flange that is reversibly or irreversibly attached to a processing vessel in which the raw material was heated and mixed. The heated and mixed waste mixture can be moved (e.g., pushed, extruded, or injected) through the die and into a mold having any appropriate shape and size. An example of a system that can be used to carry out such methods is illustrated in FIG. 2. System 200 can include processing vessel 20, which can be used to contain and process (e.g., heat and mix) a solid waste composition. Processing vessel 220 can have opening or flange 230 through which a heated and/or mixed solid waste composition can exit vessel 220. System 200 also can include die 240 and mold 250. Die 240 and mold 250 can be configured in relation to vessel 220 such that the processed solid waste composition can proceed along a path as indicated by arrow a, from processing vessel 220, through die 240, and into mold 250.

In some cases, the methods provided herein can include introducing one or more additives to a pre-processed (e.g., heated and mixed) raw material before it is formed into a composite product. For example, a heated and mixed waste material can be fed from the barrel into a mixing conveyor (e.g., a ribbon screw conveyor or a shaftless spiral conveyor), which can be adapted for introduction of one or more additives. In some cases, the one or more additives can be combined with the solid waste composition at a temperature below the temperature to which the waste material was exposed when it was in the barrel portion of the processor. For example, in some cases, water can be used to cool the pre-processed waste material before or after it is fed into the conveyor.

In some cases, one or more hoppers or extruders can be connected to or positioned along the conveyor. Each of the one or more hoppers or extruders can contain an additive that can be introduced into the pre-processed raw material as it passes through or along the conveyor. In other cases, the heated and mixed solid waste material can be moved from the barrel into a mixing vessel (e.g., a vertical mixing vessel) so that one or more additives can be introduced and the material can be blended. Any appropriate additive or combination of additives can be introduced.

As discussed above, for example, one or more polymers (e.g., thermoset resins) can be added to a pre-processed raw material (e.g., a heated and mixed solid waste composition) in any appropriate amount and at any appropriate temperature. Suitable temperatures for adding one or more polymers (e.g., thermoset resins) to a pre-processed solid waste composition can be less than about 70° C. (e.g., about 40° C. to about 50° C., about 50° C. to about 60° C., or about 60° C. to about 70° C.).

In some cases, one or more additional components can be added to a pre-processed raw material. Examples of suitable additional components include, without limitation, recycled plastics, PLA, and wood waste (e.g., sawdust).

In some cases, one or more biocides can be added to a pre-processed raw material. The inclusion of a biocide can reduce or prevent growth of pathogens (e.g., molds, fungi, bacteria, or yeast) in the products provided herein. Any appropriate biocide or combination of biocides can be added. Examples of suitable biocides include, without limitation, CuAz, ACQ, 4,5-dichloro-2-octyl-isothiazolone, zinc pyrithione, and carbendazim. One or more biocides can be added to a pre-processed raw material at any suitable temperature, such as a temperature less than 50° C. (e.g., about 35 to about 40° C., about 40 to about 45° C., or about 45 to about 50° C.). In some cases, a natural, environmentally-friendly wood sealer, such as tung oil, linseed, or beeswax can be used as an alternative to synthetic biocide treatment. Any suitable amount of biocide can be added. In some cases, a solution containing one or more biocides can be added to a composite mix (e.g., a mix that includes a solid waste composition and one or more added polymers, optionally with one or more other additives) at about 0.01 wt. % to about 15 wt. % (e.g., about 0.01 wt. % to about 0.1 wt. %, about 0.1 to about 1 wt. %, about 1 to about 5 wt. %, about 5 to about 10 wt. %, or about 10 to about 15 wt. %), prior to drying/curing of the composite.

One or more biocides can be added to a composite provided herein using any appropriate method. In some cases, for example, a process for making a composite provided herein can include blending or mixing a biocide into a solid waste composition prior to formation of a final composite form. In such methods, the biocide is added while the solid waste composition is in a softened state, and is blended for distribution throughout the solid waste composition. In some cases, however, a biocide can be applied to a composite provided herein by a method that includes brushing, spreading, spraying, deluging, fogging, immersion, hot and/or cold steeping, diffusion, pressure impregnation, using a double vacuum, or combinations thereof.

In some cases, one or more flame retardant materials can be added to a composite for fire-proofing or fire retardation. Examples of suitable flame retardants include, without limitation, phosphate flame retardants, silicon-based flame retardants, metal hydroxide flame retardants, melamine flame retardant, phosphorus-based flame retardants, halogenated flame retardants, and brominated flame retardants, as well as polymeric flame retardants, retardant coatings made from bio-based chitosan, phytic acid and divalent metal ions, or other types of ecologically-friendly flame retardants can be used. Any suitable amount of flame retardant can be added. In some cases, a solution containing one or more flame retardants can be added to a composite mix (e.g., a mix that includes a solid waste composition and one or more added polymers, optionally with one or more other additives) at about 0.01 wt. % to about 15 wt. % (e.g., about 0.01 wt. % to about 0.1 wt. %, about 0.1 to about 1 wt. %, about 1 to about 5 wt. %, about 5 to about 10 wt. %, or about 10 to about 15 wt. %), prior to drying/curing of the composite. One or more flame retardants can be added to a composite provided herein by any appropriate method. For example, a flame retardant can be incorporated into a solid waste composition during the blending and mixing phase, prior to forming a final composite product.

After the desired additives have been sufficiently combined with the pre-processed raw material, the combined material can be passed into a mold. In some cases, for example, the combined material can be fed (e.g., via a hopper) into an extruder (e.g., a screw extruder), which can push the combined material through a die and into a mold. The hopper and or the screw extruder can be heated to maintain the combined material at a suitable temperature (e.g., about 40° C. to about 200° C., or about 40° C. to about 170° C.) until it is placed into the mold. The mold can have any appropriate shape and size.

Figure 3:
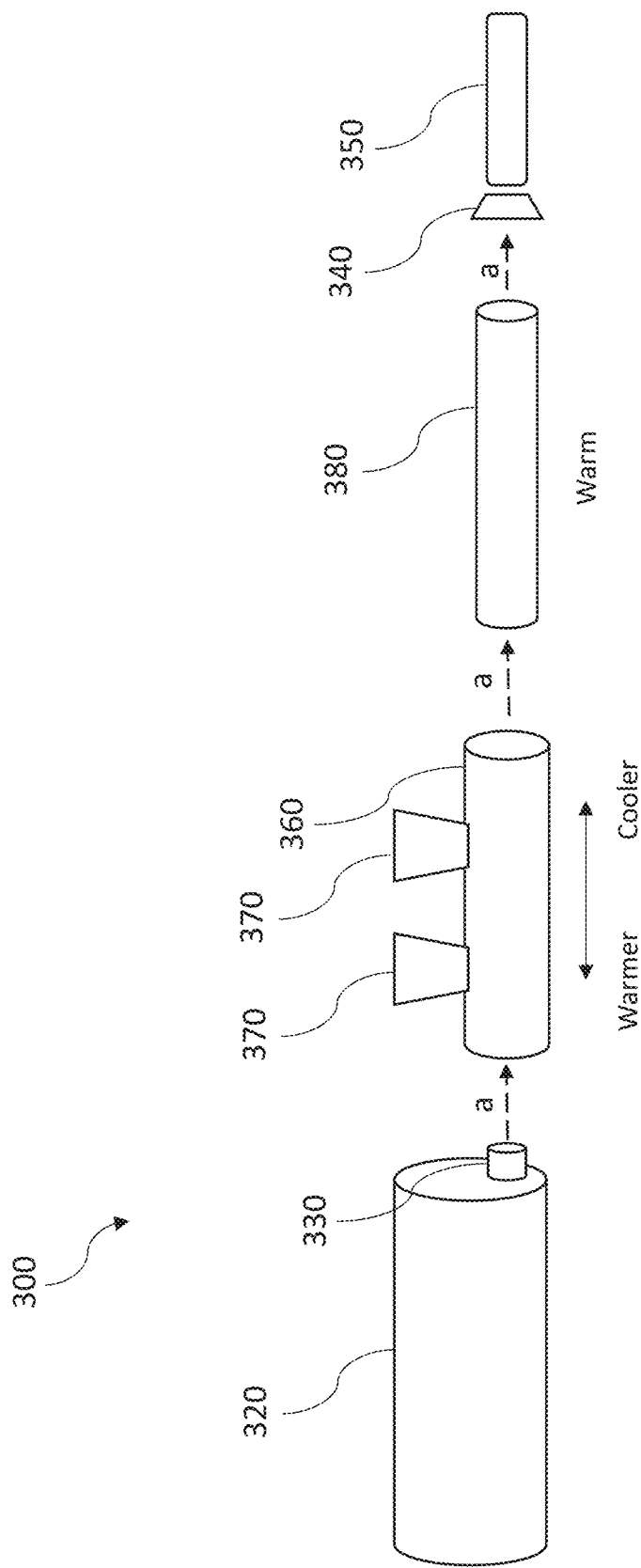
FIG. 3 is an illustration showing an embodiment of a solid waste processing system that can be used to make composites provided herein.

An example of a system that can be used to carry out a method in which one or more additives are combined with a pre-processed raw material is illustrated in FIG. 3. System 300 can include processing vessel 320, which can be used to contain and process (e.g., heat and mix) a solid waste composition. Processing vessel 320 can have opening or flange 330 through which a heated and/or mixed solid waste composition can exit vessel 320. System 300 also can include die 340 and mold 350, which can be coupled to processing vessel 320 via first conveyor 360 and second conveyor 380. First conveyor 360 can be coupled to and in fluid communication with one or more hoppers (e.g., hoppers 370), from which one or more additives (e.g., one or more polymers, biocides, flame retardants, or other additives) can be dispensed into conveyor 360 for mixing (e.g., blending) with a pre-processed (e.g., heated and/or mixed) solid waste composition contained therein. First conveyor 360 can be maintained at any appropriate temperature (e.g., a temperature or temperatures that is/are similar to or different from the temperature within processing vessel 320), such that conditions suitable for combining the one or more additives with the solid waste composition are maintained in first conveyor 360. In some cases, the temperature can be varied along the length of first conveyor 360. For example, the temperature at the end of first conveyor 360 that is proximal to processing vessel 320 can be maintained at a temperature similar to the temperature of processing vessel 320, and the temperature at the end of first conveyor 360 that is distal from processing vessel 320 can be maintained at a lower temperature that that of processing vessel 320. In such embodiments, the combined solid waste composition can gradually cool as it passes along first conveyor 360. The combined solid waste composition and additive(s) can pass from first conveyor 360 to second conveyor 380, and then through die 340 and into mold 350, as indicated by arrow a.

In some cases, rather than combining one or more additives with a pre-processed raw material in a mixing conveyor or other mixing vessel that is separate from the barrel of the processor, the barrel itself can be used for addition and/or blending of one or more additives. In such cases, the temperature of the processor can be modified to bring the pre-processed raw material to the a suitable temperature for each respective additive (e.g., less than 70° C. for thermoset resins, or less than 50° C. for biocides). After one or more additives have been sufficiently combined with the pre-processed raw material, the combined mixture can be fed into a mold. For example, the combined mixture can be passed from the processor barrel through a die (e.g., a customized die) attached to an output flange that is reversibly or irreversibly attached to the barrel. The combined material can be moved (e.g., pushed, extruded, or injected) through the die and into a mold having any appropriate shape and size.

In certain embodiments, the composites provided here can be formed into lumber products. When a lumber product is being produced, for example, the composite can be formed to have a shape and size consistent with typical lumber sizes (e.g., with end dimensions of about 2 by 4 inches, about 2 by 6 inches, about 2 by 8 inches, about 2 by 10 inches, about 1 by 2 inches, about 1 by 4 inches, about 1 by 6 inches, or about 1 by 8 inches). In some cases, the actual dimensions of the formed composite can be about 0.025 to about 0.05 inch less than the aforementioned values. The edges of the composite can be squared, rounded, or grooved, for example. The formed composite can have any appropriate length (e.g., about 1 to about 12 feet, about 1 foot, about 2 feet, about 3 feet, about 4 feet, about 5 feet, about 6 feet, about 7 feet, about 8 feet, about 10 feet, about 12 feet, about 1 to 3 feet, about 2 to 4 feet, about 4 to 6 feet, about 6 to 8 feet, about 8 to 10 feet, or about 10 to 12 feet).

Figure 4:
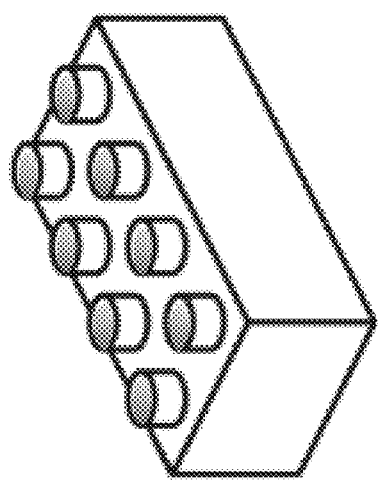
FIG. 4 includes images showing exemplary embodiments of composite products provided herein.
Figure 4:
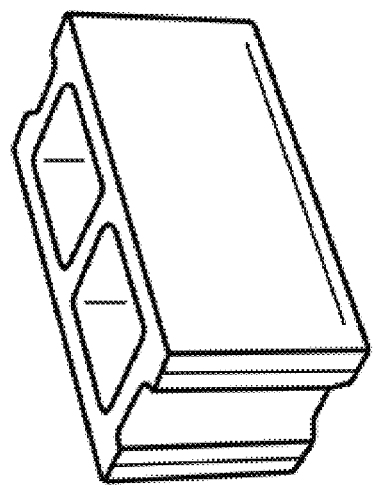

In some cases, the composites provided herein can be formed into blocks (e.g., stackable blocks) using the methods provided herein. The blocks can be solid, or the blocks can include one or more openings (e.g., as in a cinder block). In some cases, interlocking blocks can be generated with one or more protrusions or ridges and one or more apertures or ridges, such that adjacent blocks can fit together in a particular orientation. For example, LEGO®-style blocks can have one or more protrusions capable of interlocking with one or more openings in adjacent blocks. FIG. 4 depicts examples of block-type products that can be formed from the composites provided herein.

The products produced from the composites provided herein can be used, for example, as building blocks for consumer applications (e.g., retaining walls, accessory buildings such as garden sheds, or structural framework within walls). In some cases, blocks with openings extending therethrough (e.g., openings extending between a first side of the block and an opposite side of the block) can be filled with cement, concrete, or any other suitable material (e.g., sand) to add strength and stability to a structure constructed from the blocks. In some cases, one or more openings through a first block can align with one or more openings through a second block positioned adjacent to the first block, such that the openings can be filled with concrete or another material (e.g., sand) in a contiguous manner. For example, two or more blocks can be positioned one on top of the other, with one or more aligning apertures extending between the top and bottom surfaces of each block, such that cement, concrete, or another substance can be placed into each of the aligned apertures from the top down, resulting in a segment of the cement, concrete, or other substance that is contiguous within the structure. In some cases, one or more apertures through a block (e.g., one or more openings formed during molding or drilled through the block after forming) can be configured to allow for insertion of rebar. The one or more openings can be at locations that align when blocks are placed adjacent to one another, such that a single rebar piece can extend through more than one block.

In some cases, the composites provided herein can be formed for use as non-structural building materials. There are a broad number of non-structural applications for the composites provided herein in, for example, the building industry. For example, composites provided herein can be formed into configurations such that they can be used as facades, planks, covers, shingles, clapboard, or any other suitable structure.

In some cases, the composites provided herein can be formed using a mold that includes an opening (e.g., a slot or pin hole) at an end or a position distal to the entry point for the pre-processed raw material. The opening can have a size sufficient for visual confirmation of when the mold has been filled to a sufficient level. After the mold is filled, extrusion of the processed raw material can be stopped or paused, the mold can be detached from the die, a new mold can be attached, and extrusion of the processed raw material into the newly attached mold can begin. The filled mold can be removed and replaced with an empty mold manually, or the procedure can be achieved with an automated system.

Figure 5:
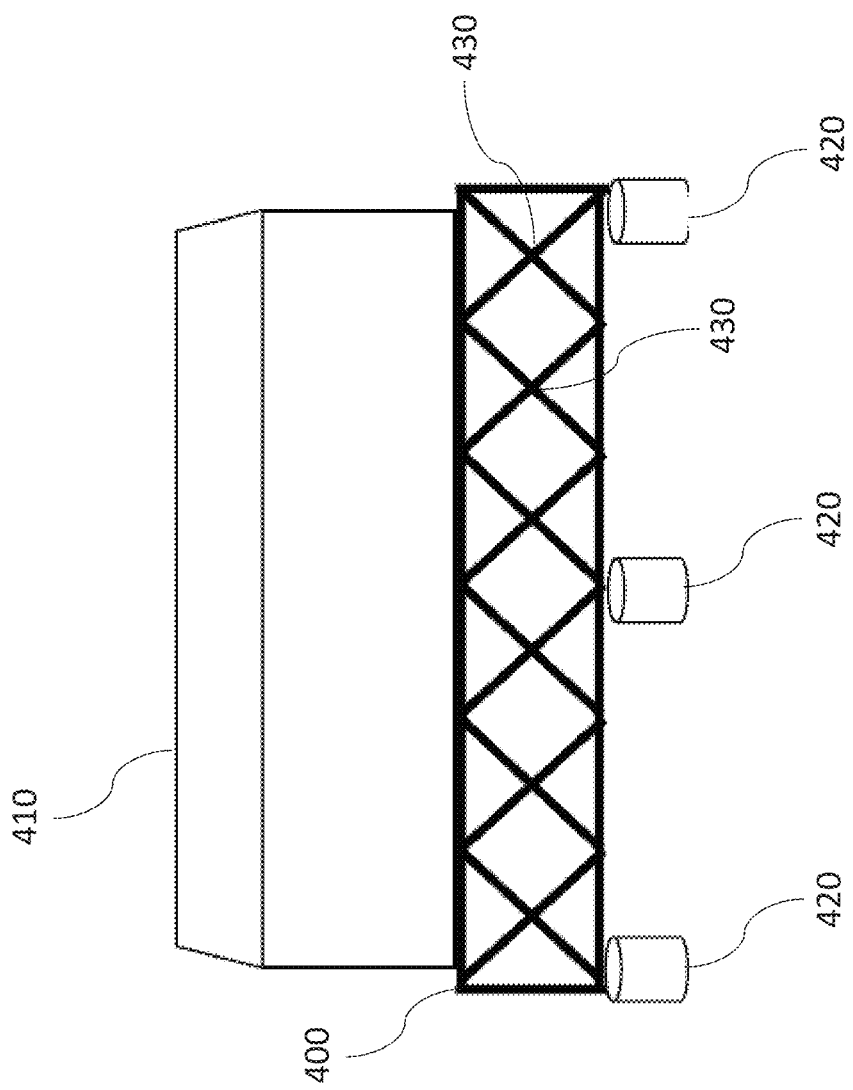
FIG. 5 is an illustration showing an embodiment of a truss containing a composite described herein.

In some cases, the composites provided herein can be used to produce building materials such as pre-fabricated accessory structures (e.g., sheds), components for accessory structure building kits (e.g., for sheds or tiny houses that can be designed for on-site assembly), or structural supports (e.g., trusses) to provide stability and force absorption in the event of an earthquake. In some cases, products that can serve as building materials can be produced in one or more molds that can be used with a system as described above. Alternatively, such building material products can be 3D-printed from a composition containing a composite provided herein. The building materials (e.g., structural supports) can have any appropriate dimensions and configuration. In some cases, for example, a building product provided herein can be a truss that includes of a series of X-shaped diagonal supports for lateral force absorption (e.g., in a seismic event). Such a truss also can provide an elevated foundation upon which a structure such as a shed or a house can be positioned, which can reduce the likelihood that the structure will be subject to flooding. For example, a truss foundation can be placed on a concrete footing (e.g., a rebar-enforced concrete footing). Where compliant with earthquake build standards, the truss foundation can absorb forces and prevent structural damage to a structure on the truss. Where footing is non-compliant, the truss foundation can act as a "floating," shock-absorbing structure that can reduce or prevent structural damage to a home structure atop the truss foundation. FIG. 5 illustrates a truss that can contain a structural composite provided herein. As depicted in FIG. 5, truss 400 can sit on footings 420. Structure 410 can be positioned on top of truss 400. In addition, truss 400 can include one or more diagonal supports, such as X-shaped supports 430. In some cases, the truss pattern can be generated by three-dimensional (3D) printing with a thermoset polymer, which can provide rigidity to the truss structure within a composite product that contains solid waste printed material that can provide compressive strength around the truss structure. Thus, a thermoset polymer-based structure can be 3D printed simultaneously to laying around it a waste-based composite material.

When a composite product described herein is formed in a mold, the mold filled with newly produced composite (e.g., a solid waste composition combined and mixed with one or more polymers, fillers, biocides, and/or fire retardants) can be allowed to cool so that when the material contained therein (the product) is removed from the mold, expansion of the formed composite product is reduced or prevented. After cooling and hardening, the formed composite product can be removed from the mold.

In some cases, a plastic or polymer (e.g., a resin) coating can be applied to one or more outer surfaces of a composite (e.g., a sustainable lumber product). In some cases, the coating can form a shell around part or all of the composite. Any suitable plastic or polymer can be used. For example, a thermoplastic or thermosetting polymer, or a hybrid thereof, can be used as a coating. In some cases, a biodegradable and/or recycled plastic can be used to provide a 100% sustainable/renewable product and/or 100% recycled product. In some cases, a coating can include a resin. Examples of polymers that can be applied to the outer surface of a product include, without limitation, epoxys, epoxy-polyester hybrids, urethane polyester, polyester triglycidyl isocyanurate (TGIC), acrylics, polyvinyl chloride, polyolefins, nylon, polyesters, and polyvinylidene fluoride. The coating can be applied using any appropriate method (e.g., spraying, dipping, pouring, or powder coating). The coating may be applied for functional (e.g., weather-proofing or prevention of damage from insects or rodents) and/or aesthetic purposes (e.g., to provide a particular color and/or texture). In some cases, for example, a resin coating can have a wood grain texture, such that the sustainable lumber product appears more like natural wood. In some cases, a polymer coating can provide a structural benefit, such as increasing the tensile strength of the finished product. A polymer coating also can allow deformation to occur within the coating (e.g., as a result of load straining).

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of making a composite, the method comprising:
    heating, in a process vessel, a solid waste composition comprising:
        mixed plastics; and
        organic materials;
    such that at least a portion of the mixed plastics in the solid waste composition becomes melted;
    during or after the heating, adding a polymer to the solid waste composition; and
    forming one or more elongate solid components extending within the composite, the one or more elongate solid components comprising the polymer.

2. The method of claim 1, wherein the polymer is a thermosetting polymer or a UV-activated polymer.

3. The method of claim 1, wherein the composite comprises about 5 wt. % to about 70 wt. % of the polymer.

4. The method of claim 1, further comprising, during or after the heating of the solid waste composition, adding an additive, a flame retardant, or a biocide.

5. The method of claim 1, further comprising forming the composite into a selected shape, wherein the forming comprises molding the composite, and cooling the molded composite, wherein the molding comprises injection molding the composite, extrusion die molding the composite, or processing the composite with a conventional screw conveyor, a conveyor die, or both.

6. The method of claim 1, wherein the composite has one or more of:
    a compressive strength of at least 1500 psi,
    a flexural yield strength of about 35 MPa to about 60 MPa,
    a modulus of rupture of about 1.5 MPa to about 50 MPa, a modulus of rupture of about 50 MPa to about 100 MPa, a tensile strength of about 40 MPa to about 150 MPa, and a tensile strength of about 150 MPa to about 450 MPa.

7. The method of claim 1, wherein at least the portion of the mixed plastics in the solid waste composition that has melted forms a plastic matrix within the solid waste composition.

8. The method of claim 1, wherein the solid waste composition comprises from about 40 wt. % to about 86 wt. % carbon, and from about 3 wt. % to about 20 wt. % hydrogen.

9. The method of claim 1, further comprising sorting the solid waste composition to remove glass and metal.

10. The method of claim 1, wherein the composite comprises less than 5 wt. % water.

11. The method of claim 1, wherein the composite compress about 5 wt. % to about 60 wt. % of the polymer.

12. The method of claim 1, wherein the solid waste composition is derived from municipal solid waste, agricultural waste, or both.

13. The method of claim 1, further comprising, during or after the heating of the solid waste composition, adding recycled plastic, polylactic acid (PLA), or wood waste to the heated solid waste composition.

14. The method of claim 1, further comprising shaping the composite in the form of a board, a plank, a stud, a block, or a brick.

15. The method of claim 1, wherein the composite comprises about 30 wt. % to about 70 wt. % of the solid waste composition, about 5 wt. % to about 70 wt. % of the polymer, and about 0.01 wt. % to about 5 wt. % water.

* * * * *

UNITED STATES PATENT AND TRADEMARK OFFICE
CERTIFICATE OF CORRECTION

PATENT NO. : 11,692,082 B2
APPLICATION NO. : 17/591494
DATED : July 4, 2023
INVENTOR(S) : Bjornulf Ostvik It is certified that error appears in the above-identified patent and that said Letters Patent is hereby corrected as shown below:

In the Claims

Column 21, Lines 16-17, in Claim 11, delete "compress" and insert -- comprises --.

Signed and Sealed this
Fifth Day of September, 2023

Katherine Kelly Vidal
Director of the United States Patent and Trademark Office